(12) United States Patent
Lee

(10) Patent No.: US 8,370,708 B2
(45) Date of Patent: Feb. 5, 2013

(54) DATA ERROR MEASURING CIRCUIT FOR SEMICONDUCTOR MEMORY APPARATUS

(75) Inventor: Seong-Seop Lee, Ichon (KR)

(73) Assignee: SK hynix Inc. (KR)

( * ) Notice: Subject to any disclaimer, the term of this patent is extended or adjusted under 35 U.S.C. 154(b) by 1036 days.

(21) Appl. No.: 11/962,819

(22) Filed: Dec. 21, 2007

(65) Prior Publication Data

US 2008/0195909 A1    Aug. 14, 2008

(30) Foreign Application Priority Data

Feb. 9, 2007   (KR) .................. 10-2007-0014067

(51) Int. Cl.
*G11C 29/00* (2006.01)
*G11C 29/04* (2006.01)

(52) U.S. Cl. ........ 714/763; 714/746; 714/766; 714/773; 365/185.09; 365/200; 365/201

(58) Field of Classification Search .................... 714/763
See application file for complete search history.

(56) References Cited

U.S. PATENT DOCUMENTS

| | | | | |
|---|---|---|---|---|
| 5,263,031 A * | 11/1993 | Inoue | ............................. | 714/766 |
| 5,392,301 A * | 2/1995 | Fukushima | .................. | 714/766 |
| 6,233,717 B1 | 5/2001 | Choi | | |
| 6,370,668 B1 | 4/2002 | Garrett, Jr. et al. | | |
| 6,374,381 B1 * | 4/2002 | Moriya | ........................ | 714/746 |
| 6,754,858 B2 | 6/2004 | Borkenhagen et al. | | |
| 6,826,113 B2 | 11/2004 | Ellis et al. | | |
| 7,325,173 B2 * | 1/2008 | Kikutake et al. | .............. | 714/703 |
| 7,373,583 B2 * | 5/2008 | Hummler | ...................... | 714/763 |
| 7,779,334 B2 * | 8/2010 | Earle et al. | ..................... | 714/763 |
| 2003/0204795 A1 * | 10/2003 | Adams et al. | ................. | 714/718 |
| 2005/0204264 A1 * | 9/2005 | Yusa | ............................. | 714/758 |
| 2006/0031741 A1 | 2/2006 | Ou et al. | | |
| 2006/0069851 A1 * | 3/2006 | Chung et al. | .................. | 711/103 |
| 2006/0080589 A1 | 4/2006 | Holm et al. | | |

FOREIGN PATENT DOCUMENTS

| | | |
|---|---|---|
| JP | 56093192 | 7/1981 |
| JP | 01260699 | 10/1989 |
| JP | 2004234770 | 8/2004 |
| JP | 2005-085357 | 3/2005 |
| JP | 2006-012360 | 1/2006 |
| JP | 2006172649 | 6/2006 |
| JP | 2007149222 | 6/2007 |
| KR | 10-1999-0026236 | 4/1999 |
| KR | 10-1999-0060758 | 7/1999 |

* cited by examiner

*Primary Examiner* — Albert Decady
*Assistant Examiner* — Justin R Knapp
(74) *Attorney, Agent, or Firm* — Baker & McKenzie LLP

(57) ABSTRACT

A data error measuring circuit for a semiconductor memory apparatus includes a data error correction unit that compares data with parity data to correct data, a data selection unit that outputs the data or the corrected data as selected data in response to a test selection signal, and a test result output unit that receives the selected data and the parity data to output a test result signal in response to the test selection signal.

15 Claims, 4 Drawing Sheets

DATA ERROR MEASURING CIRCUIT FOR SEMICONDUCTOR MEMORY APPARATUS

CROSS-REFERENCES TO RELATED APPLICATION

The present application claims priority to Korean Patent Application number 10-2007-0014067, filed on Feb. 9, 2007, in the Korean Intellectual Property Office, the contents of which are incorporated herein by reference in their entirety.

BACKGROUND

1. Technical Field

The embodiments described herein relate to a semiconductor memory apparatus, and in particular, a data error measuring circuit for a semiconductor memory apparatus.

2. Related Art

A conventional semiconductor memory apparatus is designed to store data and to output stored data. Accordingly, a test is needed to determine whether or not the semiconductor memory apparatus can store and output data.

Further, in order to increase reliability of input/output data, if a one-bit error occurs in the data, the semiconductor memory apparatus corrects the one-bit error using the ECC (Error Correction Code) and outputs corrected data. The ECC includes information related to data input to the semiconductor memory apparatus as parity data. The ECC is used to compare the data with the parity data, and when the data to be output has a one-bit error, to correct the data and output corrected data.

As shown in FIG. 1, a conventional data error measuring circuit for a semiconductor memory apparatus includes a data error correction unit 10 having the ECC, and a test result output unit 20.

When an 8-bit first data signal 'data0<0:7>' and an 8-bit second data signal 'data1<0:7>' are input to the semiconductor memory apparatus, the semiconductor memory apparatus stores the first data signal 'data0<0:7>' and a first parity data signal 'parb_data0<0:3>' having information about the first data signal 'data0<0:7>'. The semiconductor memory apparatus further stores the second data signal 'data1<0:7>' and second parity data signal 'parb_data1<0:3>' that includes information on the second data signal 'data1<0:7>'.

The data error correction unit 10 receives the first data signal 'data0<0:7>', the second data signal 'data1<0:7>', the first parity data signal 'parb_data0<0:3>', and the second parity data signal 'parb_data1<0:3>'. The data error correction unit 10 compares the first data signal 'data0<0:7>' with the first parity data signal 'parb_data0<0:3>' to output a first corrected data signal 'data_cor0<0:7>'. The data error correction unit 10 compares the second data signal 'data1<0:7>' and the second parity data signal 'parb_data1<0:3>' to output a second corrected data signal 'data_cor1<0:7>'. The first and second corrected data signals 'data_cor0<0:7>' and 'data_cor1<0:7>' are obtained by correcting the first and second data signals 'data0<0:7>' and 'data1<0:7>' having a one-bit error, respectively.

The test result output unit 20 receives the first corrected data signal 'data_cor0<0:7>' and the second corrected data signal 'data_cor1<0:7>' to output a test result signal 'Test_out', which represents the test result with a logic level.

A general data error measuring circuit for a semiconductor memory apparatus having the above-described configuration is used to write data having the same level to all of the cells and read the data, to detect an error during the test. According to this method, if a one-bit error occurs in the data to be output, the general data error measuring circuit corrects the error and outputs the corrected data.

For example, the first and second data signals 'data0<0:7>' and 'data1<0:7>' are input at a high level to the semiconductor memory apparatus and then stored therein. The data error correction unit 10 outputs the stored first and second data signals 'data0<0:7>' and 'data1<0:7>' as the first corrected data signal 'data_cor0<0:7>' and the second corrected data signal 'data_cor1<0:7>'. At this time, even if any one of the bits of the stored first and second data signals 'data0<0:7>' and 'data1<0:7>' is at a low level, the bits of the first and second corrected data signals 'data_cor0<0:7>' and 'data_cor1<0:7>' are all at the high level. Accordingly, the test result output unit 20 outputs the test result signal 'Test_out' at a high level. If the test result signal 'Test_out' is at a high level, then it can be seen that the stored first data signal 'data0<0:7>' and the second data signal 'data1<0:7>' do not have an error. When the data to be output has a one-bit error, the general data error measuring circuit corrects the error. In respects to a multi-bit error, however, the general data error measuring circuit can only determine whether or not it exists in the data.

Meanwhile, the general semiconductor memory apparatus having the ECC can only detect a multi-bit error, but cannot detect a one-bit error. Accordingly, when any one of the cells, each storing 8-bit data, is defective, the general semiconductor memory apparatus having the ECC cannot detect the defective cell. As a result, reliability of the semiconductor memory apparatus having the ECC may be degraded.

SUMMARY

A data error measuring circuit for a semiconductor memory apparatus that can discriminate a one-bit error and a multi-bit error of input data and output data is described herein.

According to one aspect, a data error measuring circuit for a semiconductor memory apparatus includes a data error correction unit that compares data with parity data to correct data, a data selection unit that outputs the data or the corrected data as selected data in response to a test selection signal, and a test result output unit that receives the selected data and the parity data to output a test result signal in response to the test selection signal.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
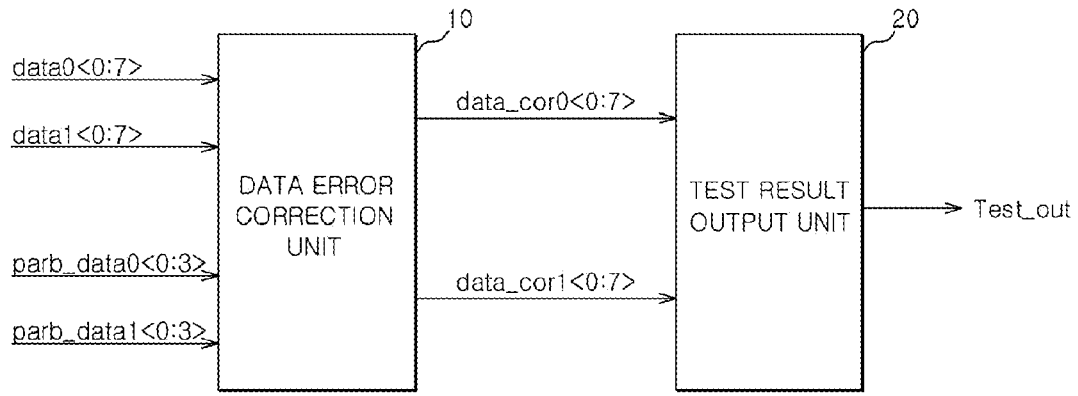
FIG. 1 is a block diagram of an exemplary data error measuring circuit for a semiconductor memory apparatus.
Figure 2:
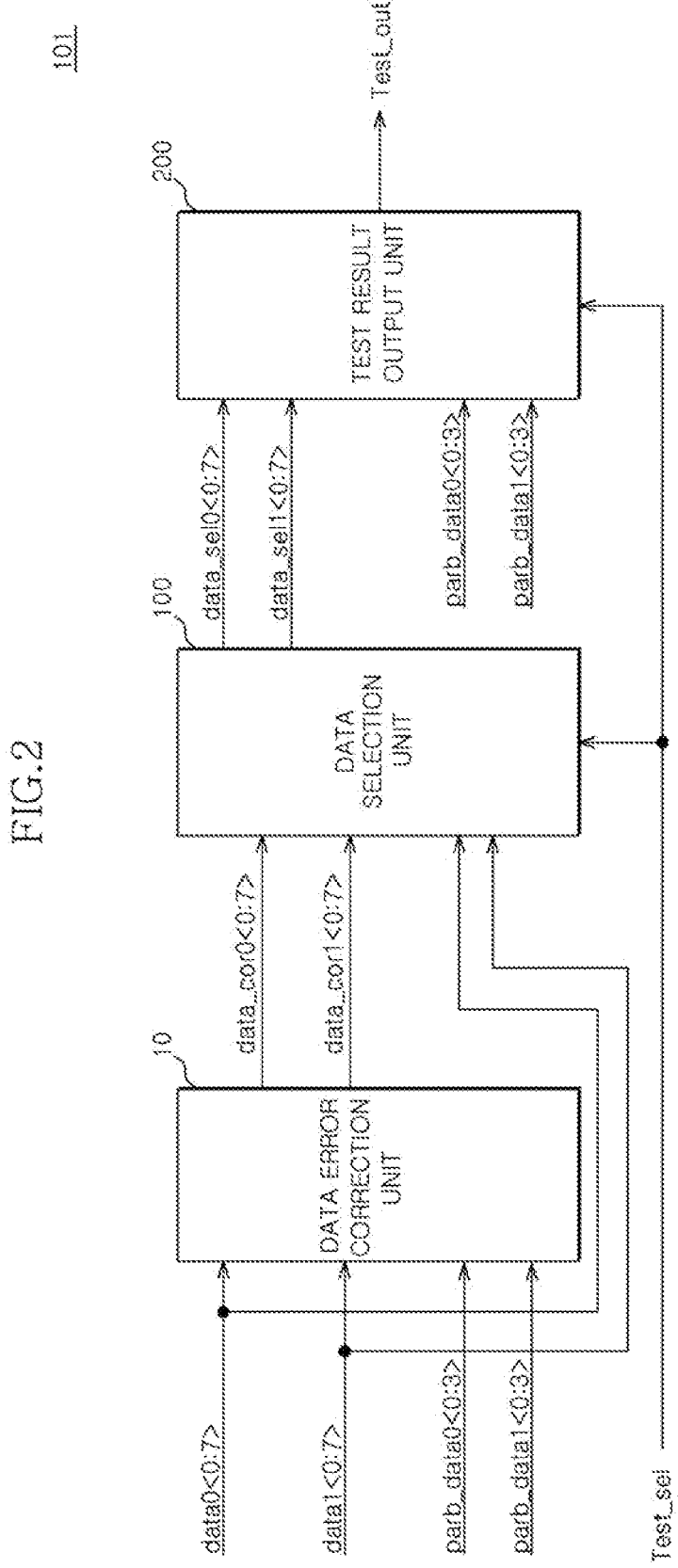
FIG. 2 is a block diagram of a data error measuring circuit for a semiconductor memory apparatus according to one embodiment.

FIG. 2 is a diagram illustrating an example data error measuring circuit 101 configured in accordance with one embodiment. As shown in FIG. 2, the data error measuring circuit 101 can include a data error correction unit 10, a data selection unit 100, and a test result output unit 200.

A semiconductor memory apparatus that includes data error measuring circuit 101 can be configured to receive and store first data signal 'data0<0:7>' and second data signal 'data1<0:7>'. At this time, the semiconductor memory apparatus stores the number of bits at a high level among a plurality of bits of the first data signal 'data0<0:7>' as first parity data signal 'parb_data0<0:3>'. In addition, the semiconductor memory apparatus stores the number of bits at the high level among the plurality of bits of the second data signal 'data1<0:7>' as second parity data signal 'parb_data1<0:3>'.

The data error correction unit 10 can be configured to correct the stored first data signal 'data0<0:7>' with the first parity data signal 'parb_data0<0:3>' and to generate first corrected data signal 'data_cor0<0:7>'. In addition, the data error correction unit 10 can be configured to correct the stored second data signal 'data1<0:7>' with the second parity data signal 'parb_data1<0:3>' and to generate second corrected data signal 'data_cor1<0:7>'.

The data selection unit 100 can be configured to output the first and second corrected data signals 'data_cor0<0:7>' and 'data_cor1<0:7>' or the first and second data signals 'data0<0:7>' and 'data1<0:7>' as first and second selected data signals 'data_sel0<0:7>' and 'data_sel1<0:7>' in response to a test selection signal 'Test_sel'.

The test result output unit 200 can be configured to compare the logic levels of the bits of the first and second selected data signals 'data_sel0<0:7>' and 'data_sel1<0:7>' with the logic levels of the bits of the first and second parity data signals 'parb_data0<0:3>' and 'parb_data1<0:3>' in response to the test selection signal 'Test_sel' to output a test result signal 'Test_out'.

Figure 3:
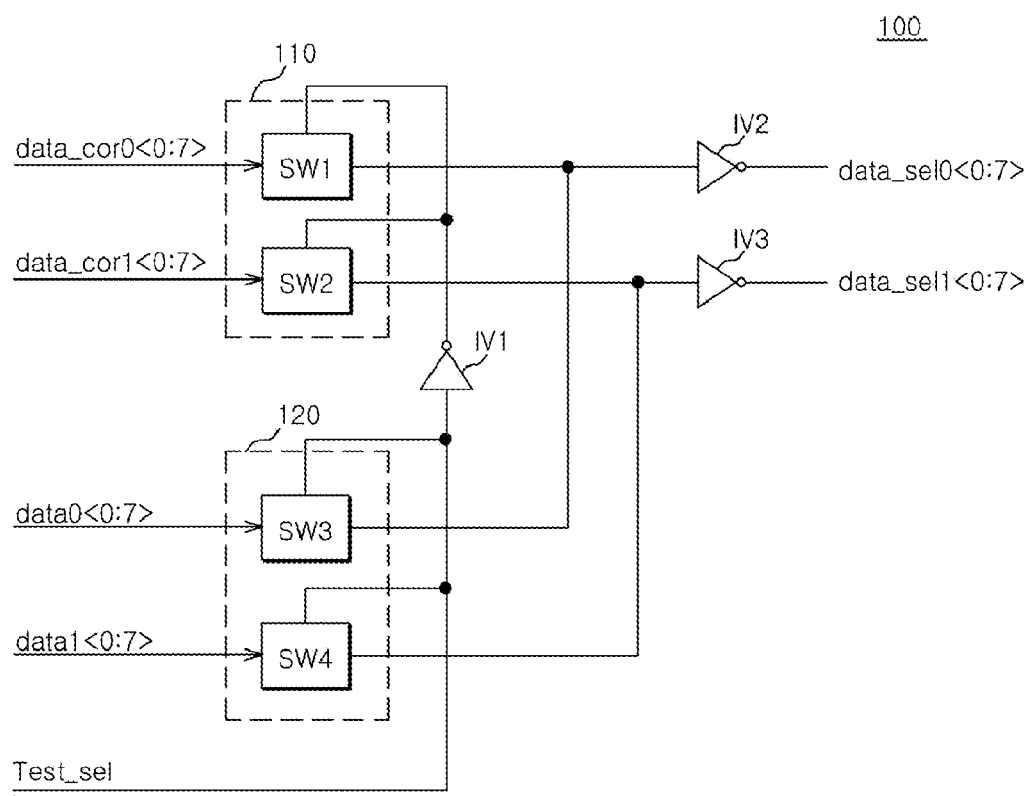
FIG. 3 is a circuit diagram of a data selection unit that can be included in the circuit shown in FIG. 2.

As shown in FIG. 3, the data selection unit 100 can include first to third inverters IV1, IV2, and IV3, and first and second switch units 110 and 120.

The first switch unit 110 can be configured to output the first and second corrected data signals 'data_cor0<0:7>' and 'data_cor1<0:7>' if the test selection signal 'Test_sel' is disabled at a low level.

The first switch unit 110 can include first and second switch elements SW1 and SW2. The first switch element SW1 can receive the first corrected data signal 'data_cor0<0:7>', and if the test selection signal 'Test_sel' is disabled at a low level, can be turned on to output the first corrected data signal 'data_cor0<0:7>'. The second switch element SW2 can receive the second corrected data signal 'data_cor1<0:7>', and if the test selection signal 'Test_sel' is disabled at the low level, then can be turned on to output the second corrected data signal 'data_cor1<0:7>'.

The second switch unit 120 can be configured to output the first and second data signals 'data0<0:7>' and 'data1<0:7>' if the test selection signal 'Test_sel' is enabled at a high level.

The second switch unit 120 can include third and fourth switch elements SW3 and SW4. The third switch element SW3 can receive the first data signal 'data0<0:7>', and if the test selection signal 'Test_sel' is enabled at a high level, then can be turned on to output the first data signal 'data0<0:7>'. The fourth switch element SW4 can be configured to receive the second data signal 'data1<0:7>', and if the test selection signal 'Test_sel' is enabled at a high level, then can be turned on to output the second data signal 'data1<0:7>'.

The first inverter IV1 can be configured to invert the test selection signal 'Test_sel' and output the inverted test selection signal to the first switch unit 110.

The second inverter IV2 can be configured to invert an output signal of the first switch element SW1 or the third switch element SW3, that is, the first data signal 'data0<0:7>' or the first corrected data signal 'data_cor0<0:7>' and output the inverted output signal as the first selected data signal 'data_sel0<0:7>'. The second inverter IV2 can have an input terminal that is commonly connected to an output terminal of the first switch element SW1 and an output terminal of the third switch element SW3, and an output terminal through which the first selected data signal 'data_sel0<0:7>' is output.

The third inverter IV3 can be configured to invert an output signal of the second switch element SW2 or the fourth switch element SW4, that is, the second data signal 'data1<0:7>' or the second corrected data signal 'data_cor1<0:7>', and output the inverted output signal as the second selected data signal 'data_sel1<0:7>'. The third inverter IV3 can have an input terminal that is commonly connected to an output terminal of the second switch element SW2 and an output terminal of the fourth switch element SW4, and an output terminal through which the second selected data signal 'data_sel1<0:7>' is output.

Figure 4:
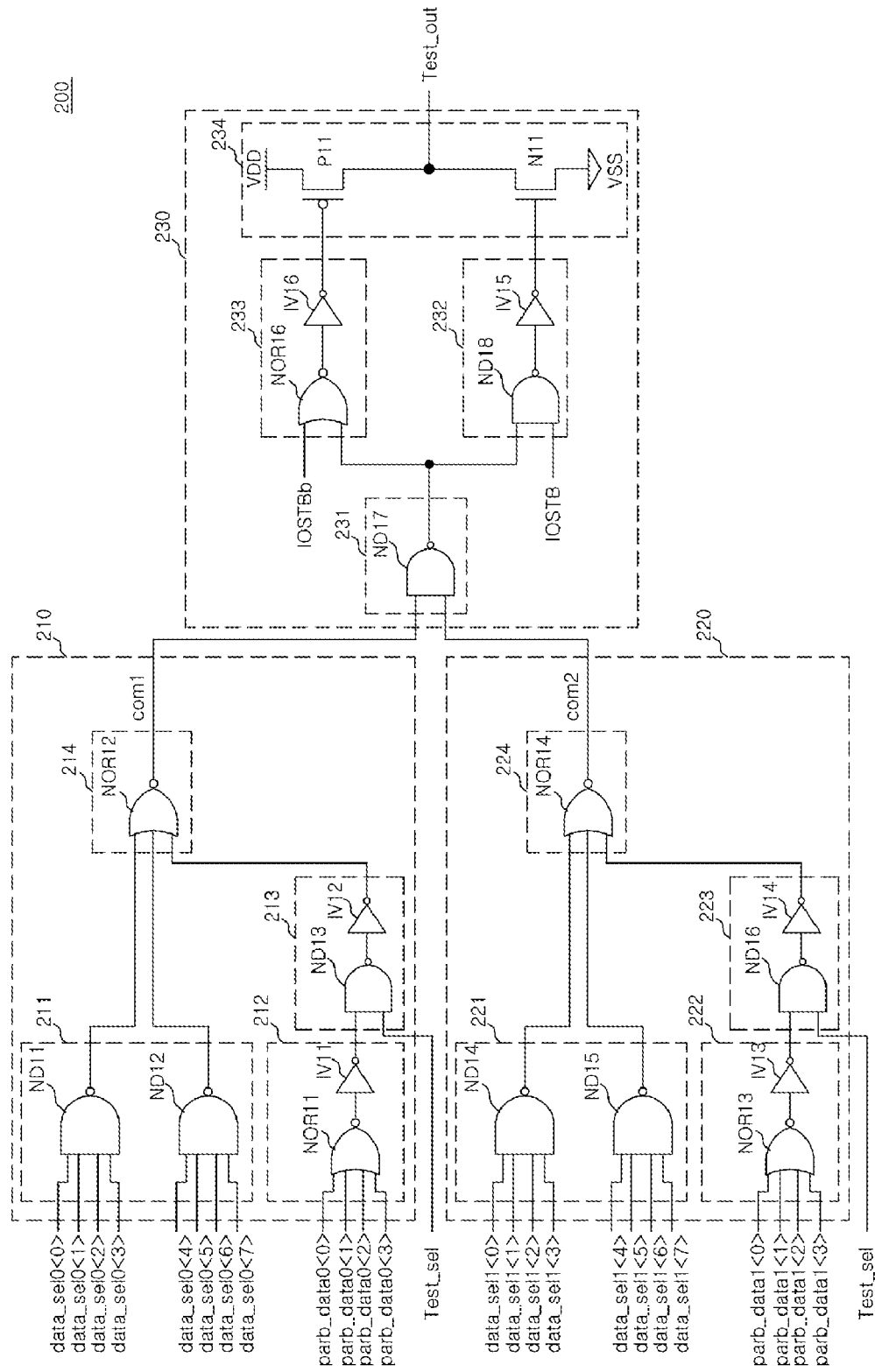
FIG. 4 is a circuit diagram of a test result output unit that can be included in the circuit shown in FIG. 2.

As shown in FIG. 4, the test result output unit 200 can include a first comparison section 210, a second comparison section 220, and a test result output section 230.

The first comparison section 210 can be configured to compare separately the bits of the first selected data signal 'data_sel0<0:7>' if the test selection signal 'Test_sel' is disabled at a low level, and to generate a first comparison signal 'com1'. Meanwhile, the first comparison section 210 can be configured to compare separately the bits of the first selected data signal 'data_sel0<0:7>' and the bits of the first parity data signal 'parb_data0<0:3>' if the test selection signal 'Test_sel' is enabled at a high level to generate the first comparison signal 'com1'.

The first comparison section 210 can include a first data bit comparison section 211, a first parity bit comparison section 212, a first parity option section 213, and a first signal combining section 214.

The first data bit comparison section 211 can be configured to output a low-level output signal if the bits of the first selected data signal 'data_sel0<0:7>' are all at the high level.

The first data bit comparison section 211 can include first and second NAND gates ND11 and ND12. The first NAND gate ND11 can be configured to receive a predetermined number of bits 'data_sel0<0:3>' of the first selected data signal 'data_sel0<0:7>'. The second NAND gate ND12 can be configured to receive the remaining bits 'data_sel0<4:7>' of the first selected data signal 'data_sel0<0:7>'.

The first parity bit comparison section 212 can be configured to output a high-level signal if any one of the bits of the first parity data signal 'parb_data0<0:3>' is at a high level.

The first parity bit comparison section 212 can include a first NOR gate NOR11 and a fourth inverter IV11. The first NOR gate NOR11 can be configured to receive the first parity data signal 'parb_data0<0:3>'. The fourth inverter IV11 can be configured to invert an output signal of the first NOR gate NOR11 and to output the inverted output signal.

The first parity option section 213 can be configured to output an output signal of the fourth inverter IV11 if the test selection signal 'Test_sel' is enabled at a high level. Meanwhile, the first parity option section 213 can be configured to output only a low-level signal if the test selection signal 'Test_sel' is disabled at a low level.

The first parity option section 213 can include a third NAND gate ND13 and a fifth inverter IV12. The third NAND gate ND13 can be configured to receive the output signal of the fourth inverter IV11 and the test selection signal 'Test_sel'. The fifth inverter IV12 can be configured to invert an output signal of the third NAND gate ND13 and output the inverted output signal.

The first signal combining section 214 can be configured to output the first comparison signal 'com1' at a high level if the output signal of the first data bit comparison section 211 and the output signal of the first parity option section 213 are all at a low level.

The first signal combining section 214 can include a second NOR gate NOR12. The second NOR gate NOR12 can receive the output signal of the first data bit comparison section 211 and the output signal of the first parity option section 213. That is, the second NOR gate NOR12 can be configured to receive the output signal of the first NAND gate ND11, the output signal of the second NAND gate ND12, and the output signal of the fifth inverter IV12.

The second comparison section 220 can be configured to compare separately the bits of the second selected data signal 'data_sel1<0:7>' if the test selection signal 'Test_sel' is disabled at a low level to generate a second comparison signal 'com2'. Meanwhile, the second comparison section 220 can be configured to compare separately the bits the second selected data signal 'data_sel1<0:7>' and the bits of the second parity data signal 'parb_data1<0:3>' if the test selection signal 'Test_sel' is enabled at a high level to generate the second comparison signal 'com2'.

The second comparison section 220 can include a second data bit comparison section 221, a second parity bit comparison section 222, a second parity option section 223, and a second signal combining section 224.

The second data bit comparison section 221 outputs a low-level output signal if the bits of the second selected data data_sel1<0:7> are all at the high level.

The second data bit comparison section 221 includes fourth and fifth NAND gates ND14 and ND15. The fourth NAND gate ND14 receives a predetermined number of bits data_sel1<0:3> of the second selected data data_sel1<0:7>. The fifth NAND gate ND15 receives the remaining bits data_sel1<4:7> of the second selected data data_sel1<0:7>.

The second parity bit comparison section 222 outputs a high-level signal if any one of the bits of the second parity data parb_data1<0:3> is at the high level.

The second parity bit comparison section 222 includes a third NOR gate NOR13 and a sixth inverter IV13. The third NOR gate NOR13 receives the second parity data parb_data1<0:3>. The sixth inverter IV13 inverts an output signal of the third NOR gate NOR13 and outputs the inverted output signal.

The second parity option section 223 outputs an output signal of the sixth inverter IV13 if the test selection signal 'Test_sel' is enabled at the high level. Meanwhile, the second parity option section 223 outputs only a low-level signal if the test selection signal 'Test_sel' is disabled at the low level.

The second parity option section 223 includes a sixth NAND gate ND16 and a seventh inverter IV14. The sixth NAND gate ND16 receives an output signal of the sixth inverter IV13 and the test selection signal 'Test_sel'. The seventh inverter IV14 can invert an output signal of the sixth NAND gate ND16 and output the inverted output signal.

The second signal combining section 224 can be configured to output the second comparison signal 'com2' at a high level if the output signal of the second data bit comparison section 221 and the output signal of the second parity option section 223 are all at a low level.

The second signal combining section 224 can include a fourth NOR gate NOR14. The fourth NOR gate NOR14 can receive the output signal of the second data bit comparison section 221 and the output signal of the second parity option section 223. That is, the fourth NOR gate NOR14 can be configured to receive the output signal of the fourth NAND gate ND14, the output signal of the fifth NAND gate ND15, and the output signal of the seventh inverter IV14.

The test result output section 230 can be configured to output the test result signal 'Test_out' at a high level if the first comparison signal 'com1' and the second comparison signal 'com2' are both at a high level and a read status signal 'IOSTB' is enabled at a high level. Meanwhile, the test result output section 230 can be configured to output the test result signal 'Test_out' at a low level if the first comparison signal 'com1' or the second comparison signal 'com2' is at a low level and a read status signal 'IOSTB' is enabled at a high level. The read status signal 'IOSTB' can be a signal that is enabled at the high level when a read command is input and the semiconductor memory apparatus performs a read operation.

The test result output section 230 can include a third signal combining section 231, a first output control section 232, a second output control section 233, and a signal generating section 234.

The third signal combining section 231 can be configured to output a low-level signal if the first comparison signal 'com1' and the second comparison signal 'com2' are both at a high level. Further, the third signal combining section 231 can be configured to output a high-level signal if the first comparison signal 'com1' or the second comparison signal 'com2' is at a low level.

The third signal combining section 231 can be configured to include a seventh NAND gate ND17. The seventh NAND gate ND17 can be configured to receive the first comparison signal 'com1' and the second comparison signal 'com2'.

The first output control section 232 can be configured to output a high-level signal if an output signal of the third signal combining section 231, that is, an output signal of the seventh NAND gate ND17 is at a high level and a read status signal 'IOSTB' is enabled at a high level. Further, the first output control section 232 can be configured to output a low-level signal if the output signal of the third signal combining section 231, that is, the output signal of the seventh NAND gate ND17 is at a low level and the read status signal 'IOSTB' is enabled at a high level.

The first output control section 232 can include an eighth NAND gate ND18 and an eighth inverter IV15. The eighth NAND gate ND18 can receive the output signal of the seventh NAND gate ND17 and the read status signal 'IOSTB''. The eighth inverter IV15 can invert an output signal of the eighth NAND gate ND18 and output the inverted output signal.

The second output control section 233 can be configured to output only a high-level signal if an inverted read status signal 'IOSTBb' is at a high level. Meanwhile, the second output control section 233 can be configured to output a low-level signal if the inverted read status signal 'IOSTBb' is at a low level and the output signal of the seventh NAND gate ND17 is a low-level signal.

The second output control section 233 can include a sixth NOR gate NOR16 and a ninth inverter IV16. The sixth NOR gate NOR16 can receive the inverted read status signal 'IOSTBb' and the output signal of the seventh NAND gate ND17. The ninth inverter IV16 can invert an output signal of the sixth NOR gate NOR16 and output the inverted output signal.

The signal generating section 234 can be configured to output the test result signal 'Test_out' at a low level if the output signal of the first output control section 232, that is, the output signal of the eighth inverter IV15 is at a high level.

Meanwhile, the signal generating section 234 can be configured to output the test result signal 'Test_out' at a high level if the output signal of the second output control section 233, that is, the output signal of the ninth inverter IV16 is at a low level.

The signal generating section 234 can include a first transistor P11 and a second transistor N11. The first transistor P11 can have a gate to which the output signal of the ninth inverter IV16 is input, and a source to which an external voltage VDD is supplied. The second transistor N11 can have a gate to which the output signal of the eighth inverter IV15 is input, a source that is connected to a ground terminal VSS, and a drain that is connected to a drain of the first transistor P11. At this time, the test result signal 'Test_out' is output from a node at which the drain of the first transistor P11 and the source of the second transistor N11 are connected to each other.

The operation of the data error measuring circuit 101 having the above-described configuration will now be described.

For the test of the semiconductor memory apparatus, the first data signal 'data0<0:7>' and the second data signal 'data1<0:7>' are input to the semiconductor memory apparatus in a state where the bits thereof are all at a low level. At this time, the bits of the first parity data signal 'parb_data0<0:3>' and the second parity data signal 'parb_data1<0:3>' are all at a low level as well. The reason the bits of the first and second parity data signals 'parb_data0<0:3>' and 'parb_data1<0:3>' are all at a low level is as follows: The first and second parity data signals 'parb_data0<0:3>' and 'parb_data1<0:3>' are determined according to the number of high-level bits among the plurality of bits of the first and second data signals 'data0<0:7>' and 'data1<0:7>'. For example, the individual bits of the first parity data signal 'parb_data0<0:3>' are at a high level if the number of high-level bits among the plurality of bits of the first data signal 'data0<0:7>' is an odd-number, and at the low level if the number of high-level bits is not an odd-number.

As a result, since the bits of the first data signal 'data0<0:7>' and the second data signal 'data1<0:7>' to be input to the semiconductor memory apparatus are all at a low level, the bits of the corresponding first and second parity data signals 'parb_data0<0:3>' and 'parb_data1<0:3>' are all at the low level.

If the semiconductor memory apparatus receives the read command, then the semiconductor memory apparatus outputs the stored first and second data signals 'data0<0:7>' and 'data1<0:7>'. At this time, if the first and second data signals 'data0<0:7>' and 'data1<0:7>' are output at a low level, then the test result signal 'Test_out' is output at a high level. If the test result signal 'Test_out' is output at a high level, then it can be determined that the cells, which store the first and second data signals 'data0<0:7>' and 'data1<0:7>', operate normally. However, if the test result signal 'Test_out' is output at a low level, then it can be seen that the cells that store the first and second data signals 'data0<0:7>' and 'data1<0:7>' are defective.

First, the test selection signal 'Test_sel' is disabled at a low level to test the semiconductor memory apparatus.

The data error correction unit 10 receives the first and second data signals 'data0<0:7>' and 'data1<0:7>' and the first and second parity data signals 'parb_data0<0:3>' and 'parb_data1<0:3>'. The data error correction unit 10 outputs the first and second data signals 'data0<0:7>' and 'data1<0:7>' as the first and second corrected data signals 'data_cor0<0:7>' and 'data_cor1<0:7>' if the bits of the first and second data signals 'data0<0:7>' and 'data1<0:7>' are all at a low level. Further, if any one of the bits of the first data signal 'data0<0:7>' or the second data signal 'data1<0:7>' is at a high level, then the data error correction unit 10 corrects the level and outputs the first and second corrected data signals 'data0<0:7>' and 'data1<0:7>' at a low level. However, when two or more bits of the first data signal 'data0<0:7>' or the second data signal 'data1<0:7>' are at the high level, the first and second corrected data signals 'data_cor0<0:7>' and 'data_cor1<0:7>' are not at a low level.

When the data selection unit 100 receives the test selection signal 'Test_sel' at a low level, the first switch unit 110 is turned on, and the first and second corrected data signals 'data_cor0<0:7>' and 'data_cor1<0:7>' are inverted and output as the first and second selected data signal 'data_sel0<0:7>' and 'data_sel1<0:7>'. Meanwhile, when the data selection unit 100 receives the test selection signal 'Test_sel' at a high level, the second switch unit 120 is turned on, and the first and second data signals 'data0<0:7>' and 'data1<0:7>' are inverted and output as the first and second selected data signal 'data_sel0<0:7>' and 'data_sel1<0:7>'.

The test result output unit 200 can receive the test selection signal 'Test_sel' at a low level. Accordingly, the first and second parity option sections 213 and 223 can output the low-level signals regardless of the output signals of the first and second parity bit comparison sections 212 and 222. As a result, if the bits of the first selected data signal 'data_sel0<0:7>' are all at a high level, then the first NAND gate ND11 and the second NAND gate ND12 output a low-level signal as the output signal of the first data bit comparison section 211. If all of the bits of the first selected data signal 'data_sel0<0:7>' are not at a high level, that is, any one bit is at the low level, then either the first NAND gate ND11 or the second NAND gate ND12 outputs a high-level signal.

Meanwhile, if the bits of the second selected data signal 'data_sel1<0:7>' are all at the high level, then the fourth NAND gate ND14 and the fifth NAND gate ND15 output a low-level signal as the output signal of the second data bit comparison section 221. If all of the bits of the second selected data signal 'data_sel0<0:7>' are not at a high level, that is, any one bit is at a low level, then either the fourth NAND gate ND14 or the fifth NAND gate ND15 outputs a high-level signal.

When the test selection signal 'Test_sel' is at a low level, the first signal combining section 214 can receive the output signals of the first data bit comparison section 211, the bits of which are all at a low level to output the first comparison signal 'com1' at the high level. Meanwhile, when any one of the bits of the output signal of the first data bit comparison section 211 is at a high level, the first signal combining section 214 can output the first comparison signal 'com1' at a low level.

When the test selection signal 'Test_sel' is at a low level, and if the bits of the output signal of the second data bit comparison section 221 are all at a low level, then the second signal combining section 224 can output the second comparison signal 'com2' at a high level. Meanwhile, if any one of the bits of the output signal of the second data bit comparison section 221 is at a high level, then the second signal combining section 224 can output the second comparison signal 'com2' at a low level.

When the test selection signal 'Test_sel' is at a high level, and if the bits of the output signals of the first data bit comparison section 211 and the first parity option section 213 are all at a low level, then the first signal combining section 214 can output the first comparison signal 'com1' at a high level. Further, if the bits of the output signals of the second data bit comparison section 221 and the second parity option section 223 are all at a low level, then the second signal combining section 224 can output the second comparison signal 'com2' at a high level.

As a result, when the test selection signal 'Test_sel' is at a low level, and if the bits of the first selected data signal 'data_sel0<0:7>' are all at a low level, then the first comparison section 210 can output the first comparison signal 'com1' at a high level. Further, when the test selection signal 'Test_sel' is at a high level, and if the bits of the first selected data signal 'data_sel0<0:7>' and the bits of the first parity data signal 'parb_data0<0:3>' are all at a low level, then the first comparison section 210 can output the first comparison signal 'com1' at a high level.

When the test selection signal 'Test_sel' is at a low level, and if the bits of the second selected data signal 'data_sel1<0:7>' are all at a low level, then the second comparison section 220 can output the second comparison signal 'com2' at a high level. When the test selection signal 'Test_sel' is at a high level, and if the bits of the second selected data signal 'data_sel1<0:7>' and the bits of the second parity data signal 'parb_data1<0:3>' are all at a low level, then the second comparison section 220 can output the second comparison signal 'com2' at a high level.

The third signal combining section 231 can output a low-level signal if the first comparison signal 'com1' and the second comparison signal 'com2' are both at a high level. If the read status signal 'IOSTB' is at a high level, that is, while the semiconductor memory apparatus performs the read operation, then the first output control section 232 can receive the output signal of the third signal combining section 231 at a low level, and output a high-level signal. Meanwhile, the second output control section 233 can output a low-level signal if the inverted read status signal 'IOSTBb' is at a low level, and the output signal of the third signal combining section 231 is at a low level.

Accordingly, the first transistor P11 that receives the output signal of the first output control section 232 is turned off, and the second transistor N11 that receives the output signal of the second output control section 233 is turned on.

The test result output section 230 can output the test result signal 'Test_out' at a low level if the read status signal 'IOSTB' is at a high level, and the first comparison signal 'com1' and the second comparison signal 'com2' are both at a high level.

Meanwhile, the test result output section 230 can output the test result signal 'Test_out' at a high level if the read status signal 'IOSTB' is at a high level, and one of the first and second comparison signals 'com1' and 'com2' is at a low level.

The data error measuring circuit 101 can be configured to test the bits of the first and second corrected data signals 'data_cor0<0:7>' and 'data_cor1<0:7>' if the test selection signal 'Test_sel' is at a low level, and output the test result as the test result signal 'Test_out'. That is, a data error measuring circuit according to the embodiments described herein can test a multi-bit error.

In addition, the data error measuring circuit 101 can test the first and second data signals 'data0<0:7>' and 'data1<0:7>' and the first and second parity data signals 'parb_data0<0:3>' and 'parb_data1<0:3>' if the test selection signal 'Test_sel' is at a high level, and output the test result as the test result signal 'Test_out'. That is, a data error measuring circuit according to the embodiments described herein can test the first and second parity data signals 'parb_data0<0:3>' and 'parb_data1<0:3>', as well as a one-bit error.

When a data error measuring circuit according to the embodiments described herein is used to test a data input/output error of a semiconductor memory apparatus, a multi-bit error as well as a one-bit error can be tested. Further, since the cells that store data are repaired using the test result, reliability of the semiconductor memory apparatus can be increased compared with a case where only a multi-bit error is tested.

While certain embodiments have been described above, it will be understood that the embodiments described are by way of example only. Accordingly, the apparatus and methods described herein should not be limited based on the described embodiments. Rather, the apparatus and methods described herein should only be limited in light of the claims that follow when taken in conjunction with the above description and accompanying drawings.

What is claimed is:

1. A data error measuring circuit for a semiconductor memory apparatus comprising:
    a data error correction unit configured to compare first and second data with first and second parity data and to generate first and second corrected data, respectively;
    a data selection unit configured to output the first and second data or the first and second corrected data as first and second selected data in response to a test selection signal; and
    a test result output unit configured to compare bits of the first and second selected data with bits of the first and second parity data in response to the test selection signal to output a test result signal, the test result output unit including:
        a first comparison section configured to detect an error in the first selected data and the first parity data in response to the test selection signal, and output the detection result as a first comparison signal;
        a second comparison section configured to detect an error in the second selected data and the second parity data in response to the test selection signal, and output the detection result as a second comparison signal; and
        a test result output section configured to output the test result signal in response to the first comparison signal and the second comparison signal when a read command is input.

2. The data error measuring circuit of claim 1, wherein the data selection unit includes:
    a first switch unit configured to output the first and second corrected data as the first and second selected data in response to the test selection signal; and
    a second switch unit configured to output the first and second data as the first and second selected data in response to the test selection signal, and wherein the first and second selected data are output from a node at which an output terminal of the first switch unit and an output terminal of the second switch unit are connected to each other.

3. The data error measuring circuit of claim 2, wherein either the first switch or second switch unit is selectively turned on according to the test selection signal.

4. The data error measuring circuit of claim 1, wherein the first selected data has a plurality of the bits and the first parity data has a plurality of the bits, and wherein the first comparison section includes:
    a data bit comparison section configured to compare the bits of the first selected data;
    a parity bit comparison section configured to compare the bits of the first parity data, a parity option section configured to output an output signal of the parity bit comparison section in response to the test selection signal; and a signal combining section configured to combine an output signal of the data bit comparison section and the output signal of the parity option section, to output the first comparison signal.

5. The data error measuring circuit of claim 4, wherein, if the bits of the first selected data are all at the high level, the data bit comparison section is configured to output a low-level signal.

6. The data error measuring circuit of claim 4, wherein, if the bits of the first parity data are all at the low level, the parity bit comparison section is configured to output a low-level signal.

7. The data error measuring circuit of claim 4, wherein the parity option section is configured to output an output signal of the parity bit comparison section or a signal at a predetermined level in response to the test selection signal.

8. The data error measuring circuit of claim 1, wherein the second selected data has a plurality of the bits and the second parity data has a plurality of the bits, and wherein the second comparison section includes:
　a data bit comparison section configured to compare the bits of the second selected data;
　a parity bit comparison section configured to compare the bits of the second parity data, a parity option section configured to output an output signal of the parity bit comparison section in response to the test selection signal; and
　a signal combining section configured to combine an output signal of the data bit comparison section and the output signal of the parity option section, and output a second comparison signal.

9. The data error measuring circuit of claim 8, wherein, if the bits of the second selected data are all at the high level, the data bit comparison section is configured to output a low-level signal.

10. The data error measuring circuit of claim 8, wherein, if the bits of the second parity data are all at the low level, the parity bit comparison section is configured to output a low-level signal.

11. The data error measuring circuit of claim 8, wherein the parity option section is configured to output an output signal of the parity bit comparison section or a signal at a predetermined level in response to the test selection signal.

12. The data error measuring circuit of claim 1, wherein the test result output section includes:
　a signal combining section configured to receive the first comparison signal and the second comparison signal;
　first and second output control sections are configured to output an output signal of the signal combining section as the test result signal when the read command is input; and
　a signal generating section configured to output the output signals of the first and second output control section as the test result signal.

13. The data error measuring circuit of claim 12, wherein the first output control section is configured to output the output signal of the signal combining section as the test result signal in response to a read status signal.

14. The data error measuring circuit of claim 12, wherein the second output control section is configured to output the output signal of the signal combining section as the test result signal in response to a read status signal.

15. The data error measuring circuit of claim 12, wherein the signal generating section includes:
　a first transistor that has a source connected to a ground terminal, and a gate, to which an output signal of the first output control section is input; and
　a second transistor that has a source, to which an external voltage is supplied, a gate, to which an output signal of the second output control section is input, and a drain connected to a drain of the first transistor, and the test result signal is output from a node at which the first transistor and the second transistor are connected to each other.

\* \* \* \* \*